United States Patent [19]

Biessman et al.

[11] Patent Number: 5,163,051
[45] Date of Patent: Nov. 10, 1992

[54] PAIRED BIT ERROR RATE TESTER

[75] Inventors: William J. Biessman, Aberdeen; William D. Tarver, Little Silver, both of N.J.

[73] Assignee: Telecom Analysis Systems Inc., Eatontown, N.J.

[21] Appl. No.: 474,147

[22] Filed: Feb. 2, 1990

[51] Int. Cl.$^5$ .............................................. G06F 11/00
[52] U.S. Cl. ..................................... 371/5.1; 371/20.1
[58] Field of Search ................. 371/5.1, 20.1, 5.4, 371/20.4, 20.6

[56] References Cited

U.S. PATENT DOCUMENTS

| | | | |
|---|---|---|---|
| 3,534,264 | 10/1970 | Blasbalg et al. | 325/15 |
| 3,916,379 | 10/1975 | Dulaney et al. | 340/146.1 |
| 3,934,224 | 1/1976 | Dulaney et al. | 340/146 |
| 4,225,960 | 9/1980 | Masters | 371/47 |
| 4,268,905 | 5/1981 | Johann et al. | 371/21.1 |
| 4,542,507 | 9/1985 | Read | 371/22 |
| 4,661,953 | 4/1987 | Venkatesh et al. | 371/16 |
| 4,677,619 | 6/1987 | Kawai | 371/5 |
| 4,710,924 | 12/1987 | Chum | 371/4 |
| 4,713,810 | 12/1987 | Chum | 371/4 |
| 4,720,829 | 1/1988 | Fukasawa et al. | 371/5 |
| 4,933,939 | 6/1990 | Kendall et al. | 371/5.5 |
| 4,937,811 | 6/1990 | Harris | 370/5 |

FOREIGN PATENT DOCUMENTS 2120042 11/1983 United Kingdom .

Primary Examiner—Jerry Smith
Assistant Examiner—Ly Van Hua
Attorney, Agent, or Firm—Peter L. Michaelson

[57] ABSTRACT

A Bit Error Rate (BER) test arrangement, composed of two autonomous BER test systems, effects the full-duplex testing of a pair of co-located modems terminating a simulated transmission link by utilizing a single processor to control each independent BER test system and a buffer storage device, preferably a dual-port random access memory and a multiple access memory serving each of the test systems, to post information communicated between the controller processor and each of the test systems. This arrangement minimizes duplication of circuitry by assigning basically identical processing operations of the individual test systems to the single processor.

8 Claims, 9 Drawing Sheets

PAIRED BIT ERROR RATE TESTER

FIELD OF THE INVENTION

This invention relates generally to digital data transmission systems and, more particularly, to monitoring the transmission accuracy of a pair of modems operating in the full-duplex mode and in the presence of impairments on a facility interconnecting the modems.

BACKGROUND OF THE INVENTION

Historically as well as today, the transmission of digital data in both public and private networks relies upon the use of modems. Modems are modulators/demodulators designed for transmission of incoming data streams over analog facilities such as a conventional 300-3400 Hz analog telephone line. Modems were devised because it was more economical to use the existing analog telephone network rather than constructing new, separate digital transmission networks.

A telephone link through the switched telephone network is made up of numerous telephone lines once the link is established via call set-up. Although the electrical characteristics of the individual lines may be known with some certainty, it is difficult to predict the overall electrical behavior of the complete circuit, including the end systems with the embedded modems, because of the myriad of paths that may be selected basically at random by the network routing algorithms during set-up of the link. One reason for this difficulty is that significant mismatches may occur between the individual lines as well as between the modems and the lines to which the modems are connected. The overall electrical behavior of the link brought about by such effects as these circuit mismatches, non-linearities and noise—both "gaussian" and impulse type—can cause errors in the received data stream.

A common measure used to describe the occurrence of errors in an end-to-end digital data transmission system including the modems as link terminations is the Bit Error Rate (BER). In practice, the BER is estimated by counting the number of bits received in error ($N_E$) by a given modem during a specified interval and taking the ratio of $N_E$ to the total number of bits received ($N_R$) during the interval, that is, BER=$N_E/N_R$. For example, a BER of $0.5 \times 10^{-7}$ would indicate an error for every two million bits received by the given modem.

The BER, besides being a very meaningful measure of performance of the overall system, is an excellent maintenance and diagnostic parameter since degradation which may affect the quality of the transmitted data stream will also have a measurable affect on the BER.

The usual procedure for measuring the BER is to transmit over the end-to-end connection a so-called maximal length, pseudo-random binary sequence generated by an n-stage shift register circuit, or by storing the equivalent sequence in a storage device and emitting the stored bits serially at a given clock rate. A maximal length sequence is expressed by the relation $(2^n-1)$. Typically, sequences of lengths 63, 511 and 2047 bits have been used for low-speed services such as voiceband data. As sequence lengths grow longer, the likelihood of detecting malfunctions associated with specific data patterns increases. The sequence length is selected as a trade-off between the accuracy of the approximation $N_E/N_R$ as representing the true error probability, and the complexity of the alignment, i.e. "block synchronization," in the error detector. Alignment refers to the need to synchronize the received data stream with the test pattern so that errors may be identified bit-by-bit.

Most BER tests are accomplished off-line, that is, there is not transmission of actual data taking place during the BER measurement. In fact in these situations, a so-called Bit Error Rate Tester (BERT) is substituted for the real digital data source. If the end systems are geographically separated as is the case in an actual working or field environment, then two independent BERTs are substituted for each of the end system data sources and the testing can then be accomplished in the full-duplex mode, that is, propagation of data can occur in each direction of transmission simultaneously with uncorrelated data. It is also possible to measure the BER using just one BERT if the far-end modem, that is, the one not having a BERT connected to it, is placed in a "loop-back" mode wherein the modem's data receive and transmit ports are bridged together. This simulates full-duplex testing except that the data streams are correlated.

During the exercising of new modem designs, it is usually the case that the end systems, including the modems and a simulated version of the network link, are co-located in a laboratory environment. Prior art arrangements have merely treated this laboratory situation in a straightforward manner as being an less complex case of general testing. It has not been appreciated that certain testing circuitry such as I/O devices and peripheral device access to the BER test equipment may be unnecessarily replicated. No prior art arrangements have capitalized on the fact that the two systems are co-located to realize a reduction in duplicated circuitry along with concomitant reduction in the cost and increased reliability of the test equipment.

SUMMARY OF THE INVENTION

These limitations as well as other shortcomings and deficiencies are obviated, in accordance with the present invention, by the coalescing of duplicated circuitry in co-located BER testers while maintaining the capability of effecting independent, bidirectional full-duplex testing.

In accordance with a preferred embodiment of the present invention, each of two BER testing systems includes a transmitter serving a modem at one end and a companion receiver serving a modem at the other end, such that, at each modem location, the transmitter of one system is paired with the receiver of the other system. A single controller coupled, through preferably a dual-port random access memory (RAM) and a multiple access memory bus, to both transmitters and both receivers controls those functions and operations which are common to both testing systems. The controller is also coupled to a single I/O device which can provide results from both tests alternately to the user. The I/O device also serves as an input mechanism to supply data for testing purposes. An optional control device, such as a Personal Computer, can be coupled to the controller over an external bus port. In effect, the computer is then able to control two independent BER tests using only one adapter port, thereby further exploiting reduction in circuitry engendered by co-location.

The organization and operation of this invention will be better understood from a consideration of the detailed description of the illustrative embodiment thereof, which follows, when taken in conjunction with the accompanying drawing.

DETAILED DESCRIPTION

To place in perspective the detailed description of the present invention and thereby highlight the departure from the art as disclosed and claimed herein, it is both instructive and informative to present certain foundational principles concerning conventional data transmission testing arrangements and their concomitant methodologies. Accordingly, the initial part of this detailed description discusses prior art testing arrangements as applied to testing the transmission accuracy of a modem pair in the presence of impairments on a facility interconnecting the modems. This approach has the additional advantage of introducing terminology and notation that will aid in elucidating the various aspects of the present invention.

CONVENTIONAL ARRANGEMENTS

Figure 1:
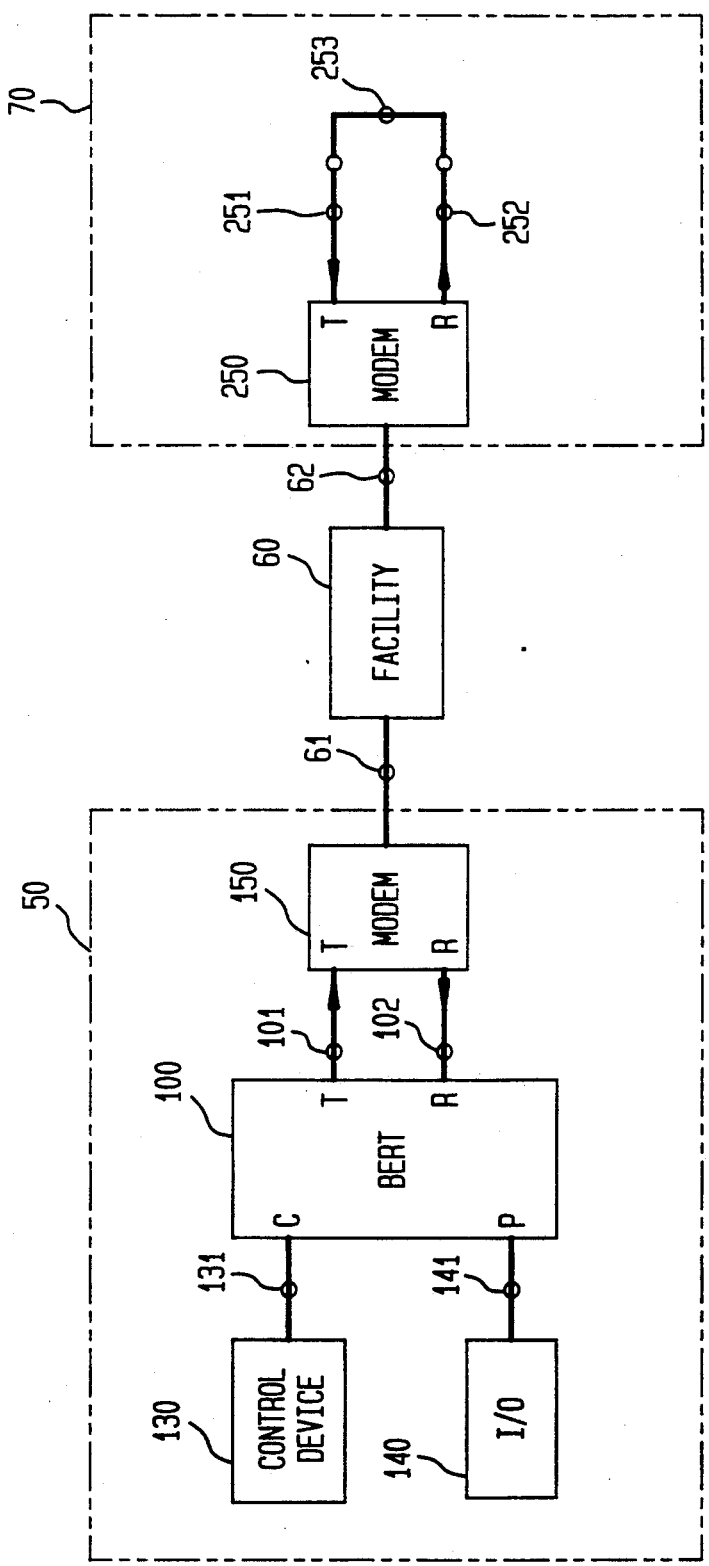
FIG. 1 is a block diagram representation of a prior art arrangement for the loop-back testing of a pair of modems located in geographically-separated first and second system, respectively.

With reference to FIG. 1, there is shown a block diagram of a prior art arrangement for the loop-back testing of modems 150 and 250 which are embedded in geographically-separated systems 50 and 70, respectively. Modems 150 and 250 are interconnected by bidirectional facility 60 via leads 61 and 62, respectively; generally, facility 60 is a standard transmission medium such as a two-wire cable pair. This block diagram is typical of a so-called field test situation fostered by a modem user/customer reporting an error condition, such as an unacceptable number of character errors in received data. Oftentimes in such a situation, a test person employed by the facility provider is dispatched to test for and locate the origin of the error condition. To mitigate testing costs, only one test person utilizing a single Bit Error Rate Tester (BERT), shown by reference numeral 100, is deployed for the field test.

For the sake of the immediate operational discussion relating to FIG. 1, system 50 is presumed to be the near-end or test system, whereas system 70 is the far-end or the loop-back system. In the far-end system 70, the transmit input and receive output of modem 250, appearing on leads 251 and 252, respectively, are interconnected via jumper lead 253. This jumper interconnection may be effected manually, or even automatically for modems having this capability. In near-end system 50, BERT 100 is connected to the transmit input and receive output of modem 150, appearing on leads 101 and 102, respectively, via the T(ransmitter) and R(eceiver) ports of BERT 100. In addition, BERT 100 has a C(ontrol) port connected to control device 130 via lead 131, and a P(anel) port connected to I/O device 140 via lead 141.

In operation, BERT 100 generates a test pattern internally and then emits this pattern as a serial bit stream from its T port to modem 150. In turn, modem 150 converts the serial bit stream into a signal format appropriate for transmission over facility 60. Modem 250 detects the incoming signal and emits the signal in digital format on lead 252. The detected data stream on lead 252 now serves as the input to the T port of modem 250 via leads 253 and 251. Again, in turn, this data stream is converted by modem 250 into a format suitable for transmission over facility 60. Finally, modem 150 detects the incoming data stream arriving on its R port and converts this arriving data to produce a return data stream. To complete the test operation, presuming the test pattern and the test data stream are synchronized via standard synchronization circuitry embedded in BERT 100, the return data stream is compared bit-by-bit to the generated test pattern. The results of the comparison are used to compute a Bit Error Rate (BER). This BER is displayed on I/O device 140; its value serves as the primary measure for judging the acceptability/unacceptability of the overall operation of systems 50 and 70.

Because of the simultaneous transmission of data in two directions on facility 60, the testing mode is inherently full-duplex. However, because the data propagating over the facility in the forward direction (modem 150 to modem 250) is essentially a delayed version of the data propagating in the return direction, the separate data streams are highly correlated; consequently, not all impairments may be fully exercised. This is an important limitation of the loop-back testing.

Although control device 130 has been shown in FIG. 1, it was shown merely for completeness for the loop-back, field test situation. Control device 130 is typically a Personal Computer (PC) or workstation which serves to provide test parameters to BERT 100; such parameters include the length of the test pattern and the testing interval, that is, how many times the test pattern should be repeated. However, device 130 is usually not deployed for a field test situation in that device 130 may be cumbersome and, moreover, the test pattern and testing interval are fixed for sake of expediency. Device 130 is generally deployed in a laboratory test set-up wherein systems 50 and 70 are co-located and facility 60 is simulated; such a testing situation is discussed in more detail below.

Figure 2:
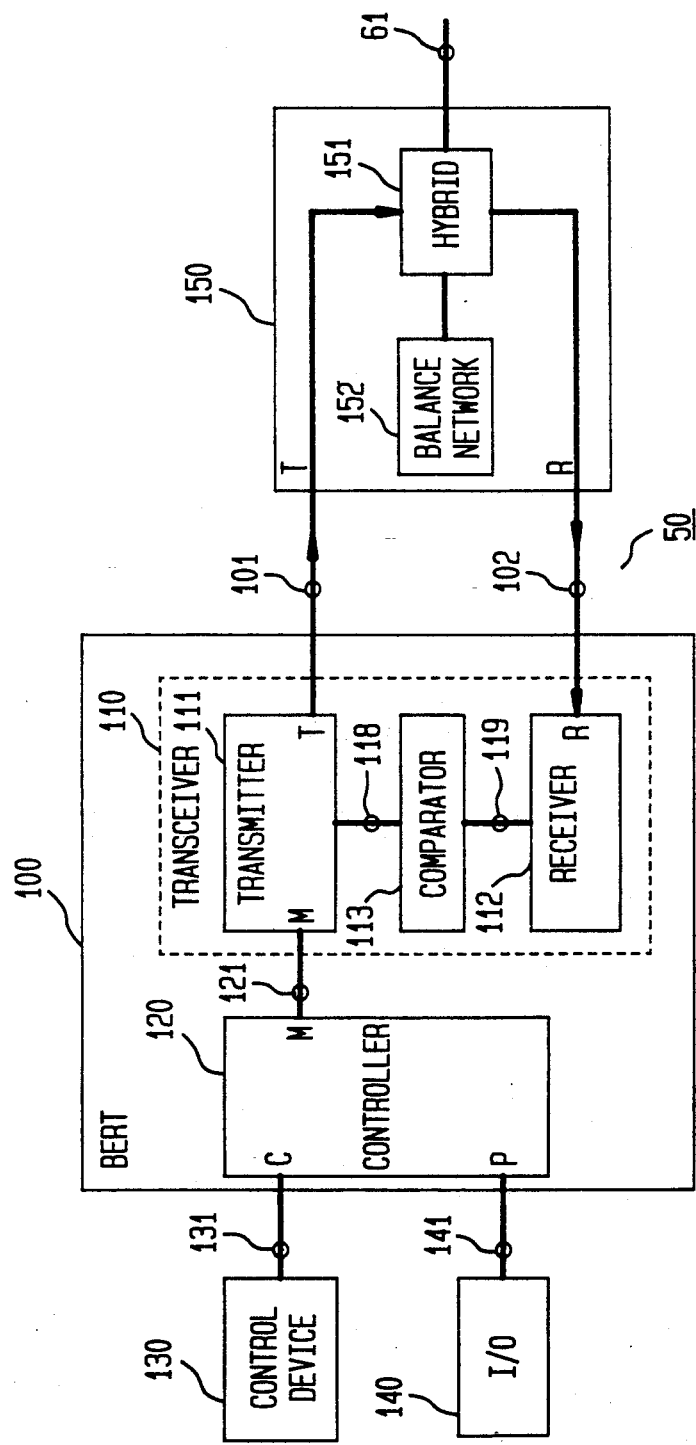
FIG. 2 is a block diagram showing details of the first system of FIG. 1, and in particular, the basic elements of a single bit error rate tester (BERT) utilized for the loop-back test.
Figure 5:
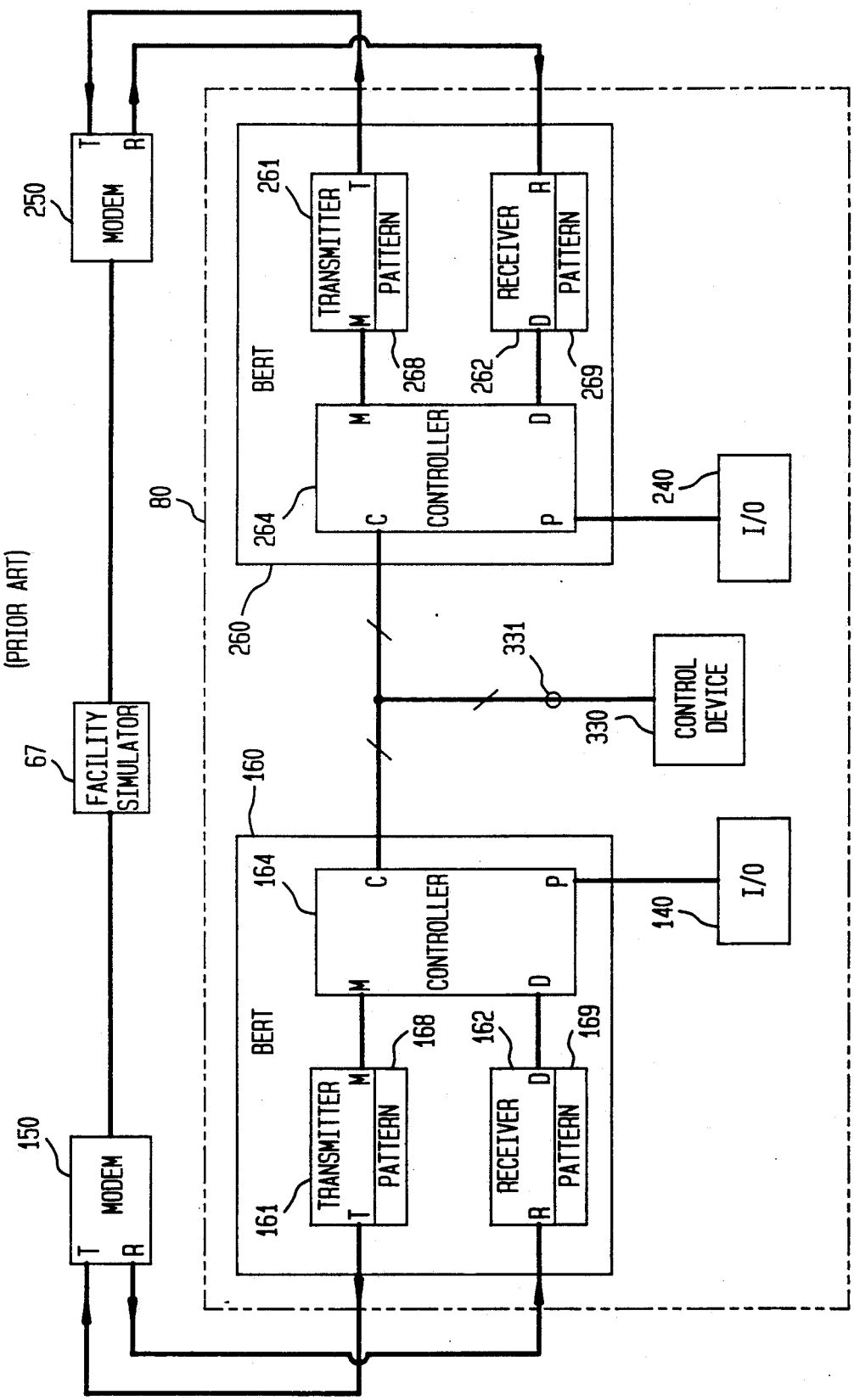
FIG. 5 is the arrangement of FIG. 4 recast for the case wherein the first and second systems are co-located.

The block diagram of FIG. 2 depicts essential subcomponents of conventional BERT 100 utilized for the loop-back testing represented in FIG. 1. In particular, BERT 100 is composed of transceiver 110 and controller 120. In turn, transceiver 110 is made up of transmitter 111, receiver 112, and comparator 113. Receiver 112 is coupled to comparator 113 via lead 119, whereas transmitter 111 and comparator 113 are linked via lead 118. Controller 120 is coupled to transceiver 110 via bus 121, which joins the M(emory) ports of transmitter 111 and controller 120. In addition, controller 120 provides the C and P ports of BERT 100, whereas transmitter 111 and receiver 112 provide the T and R ports, respectively. Finally, comparator 113 serves to facilitate synchronization of transmitter 111 with receiver 112 as well as effecting bit error measurements. The functions of the controller and transceiver are discussed when FIG. 5 is discussed.

Also shown in FIG. 2 is an equivalent circuit for modem 150 if it is presumed that modem 150 represents a conventional two-wire modem, that is, one wherein both transmit and receive data streams are propagated over the same two-wire medium. Modem 150 is composed generically of hybrid 151 and balance network 152. With an ideal hybrid, a transmit signal appearing on T lead 101 is split between lead 61 and network 152, whereas a receive signal on arriving on lead 61 would be coupled to R lead 102 and be blocked by unidirectional lead 101. In practice, a hybrid is non-ideal, so there is some leakage of signals between the T and R leads. Thus, to obtain a true indication of the affect of impairments on an end-to-end digital data link, it is crucial to test in a full-duplex mode so as to account for the effects of trans-hybrid leakage between two independent, simultaneously-occurring data streams.

Figure 3:
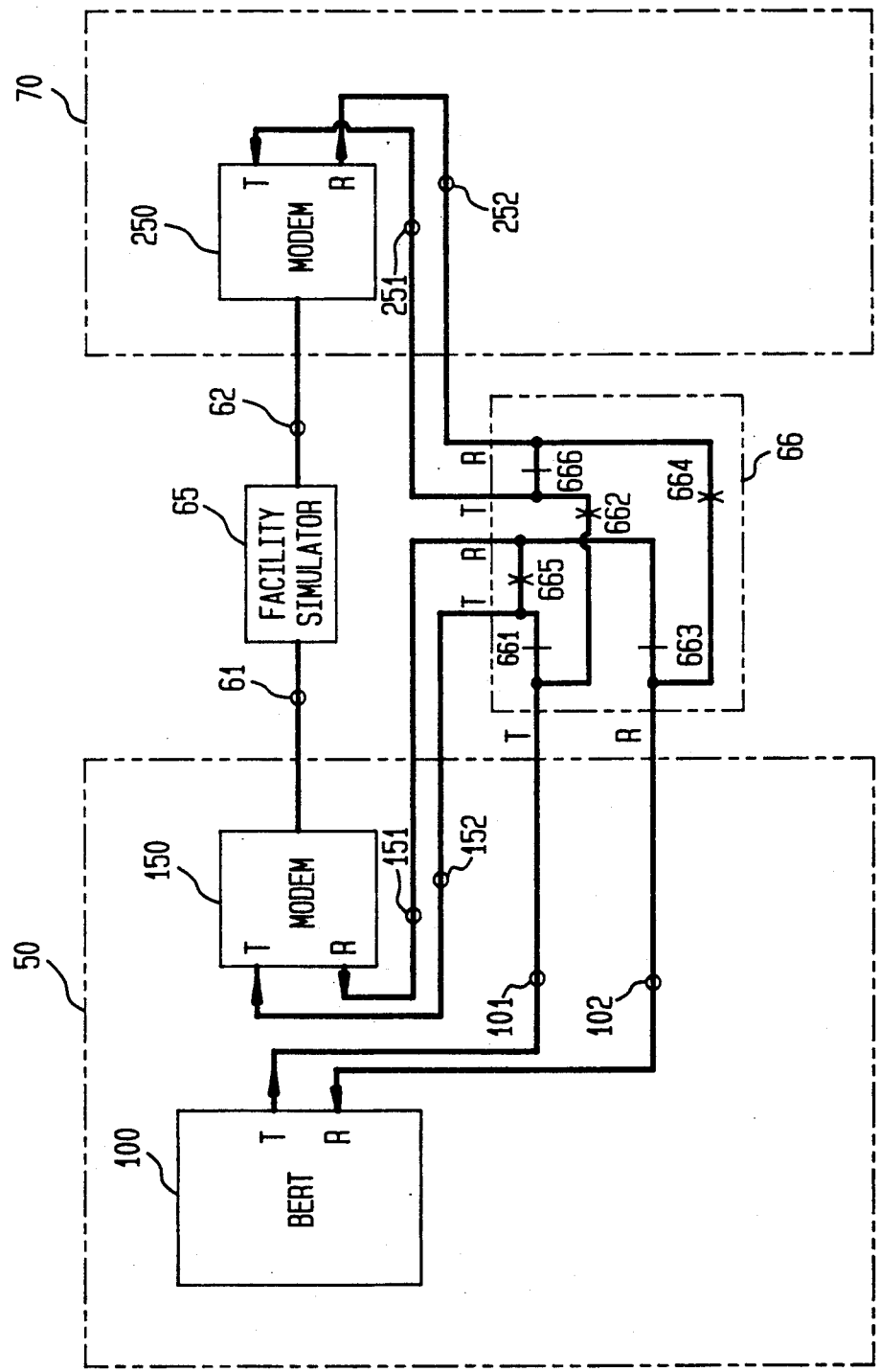
FIG. 3 is a prior art arrangement for the full-duplex testing of the modems of FIG. 1 utilizing one BERT when the two systems are co-located.

Referring to FIG. 3, there is shown a prior art arrangement for the full-duplex testing of modems 150 and 250 of FIG. 1 when systems 50 and 70 are co-located. In this way, each end system can be a near-end or test system, but not concurrently. Switch 66 is used to direct the test pattern stream either from modem 150 to modem 250 or vice versa, depending upon the switch setting. As shown in FIG. 3, the interconnection provided by contacts 661-666 of switch 66 produces essentially the same loop-back test as described with reference to FIG. 1. Activation of switch 66 to close open contacts 662, 663, 666 and open closed contacts 661, 663, 665 effects a loop-back test arrangement wherein modem 150 now has its T and R leads shorted, namely, leads 151 and 152, and BERT 100 is directly coupled to modem 250.

Because systems 50 and 70 are now co-located, the facility interconnecting systems 50 and 70, shown by facility simulator 65, is usually a simulated version of actual facility 60 of FIG. 1. Facility simulator 65 is typically composed of passive components that represent lengths of two-wire cable. However, it is also possible to configure simulator 65 with non-linear impairments and with active impairments such as a noise source. If simulator 65 is not bidirectional, appropriate switching must be arranged to place simulator 65 in the direction of data propagation during testing.

Figure 4:
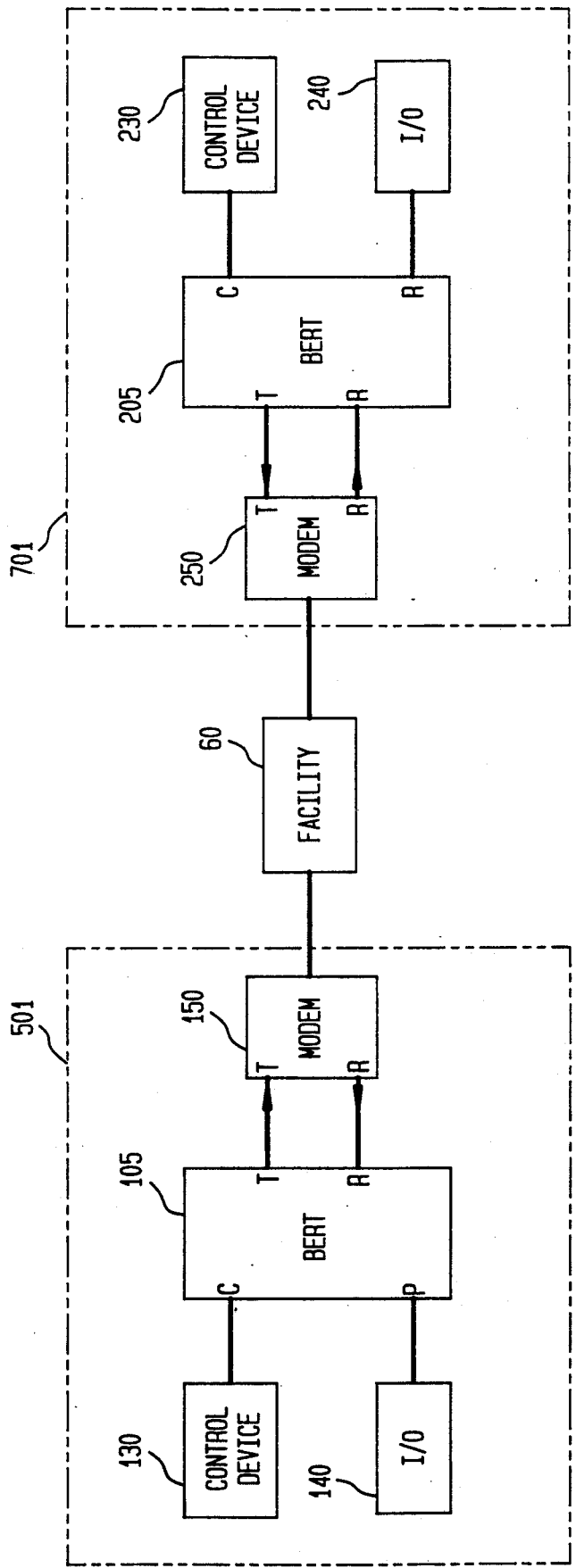
FIG. 4 is a prior art arrangement for full-duplex testing of a pair of modems located in geographically-separated first and second systems, respectively, which requires two independent BERTs.

A prior art arrangement for the full-duplex testing of geographically-separated modems 150 and 250 is shown in FIG. 4. End system 501 is basically configured in a manner commensurate with end system 50 in FIG. 1. However, BERT 105 of FIG. 4 replaces BERT 100 of FIG. 1 because there are differences at the circuit level, as will be discussed shortly with reference to FIG. 5. End system 701 is basically identical to the configuration of end system 501. Two BERTs are required for the independent, concurrent testing of the two directions of transmission, and because of the reciprocal nature of desired testing, BERTs 105 and 205 are implemented in essentially the same manner. It should be noted that full-duplex testing of this end-to-end system, besides requiring replication of BERTs, also requires duplication of interface devices, such as control devices 130 and 230 and I/O devices 140 and 240 in systems 501 and 701, respectively.

If it is desired to test modems 150 and 250 in a laboratory environment, it is possible to recast the testing arrangement of FIG. 4 and arrive at the testing arrangement of FIG. 5. In the arrangement of FIG. 5, bidirectional facility simulator 67 substitutes for real facility 60. Moreover, because of the co-location of modems, end systems 501 and 701 coalesce into a single system shown by reference numeral 80. The two independent BERTs, referred to by indicia 160 and 260, respectively, are commensurate with BERTs 105 and 205 of FIG. 4. BERTs 160 and 260 each have a P(anel) port connected to independent I/O devices 140 and 240, respectively. However, because the BERTs are co-located, only one control device, now labeled as element 330, is actually needed to service both BERTs; control device 330 couples to the respective C(ontrol) ports of the BERTs via bus 331.

The manner of assessing bit errors for the arrangements of FIGS. 4 and 5 differs from earlier techniques since two independent BERTs are now involved in the testing and the testing mode is full-duplex. To understand this difference, propagation of test data in a first or forward direction from BERT 160 to BERT 260 is described in detail. Propagation of test data in a second or reverse direction, namely, from BERT 260 to BERT 160, occurs in a manner substantially the same as the forward direction.

Transmitter 161 in BERT 160 and receiver 262 in BERT 260 are paired to form the means for testing the forward propagation direction. BERTs 160 and 260 operate autonomously, that is, there is no direct interconnection between the two testers. Accordingly, it is not possible to arrange for the direct comparison of data stream produced by transmitter 161 with the output stream detected by receiver 262 (note for a single BERT, the transmitter-receiver pair is implemented in the same test unit and a comparator-type device can be easily interposed between the pair). Thus, if the data stream generated by transmitter 161 were arbitrary, receiver 262 could not evaluate the integrity of the detected data stream, so bit error rate testing would not be possible. To effect bit error rate testing for autonomous BERTs, transmitter 161 emits a test pattern known to receiver 262; the transmitter test pattern is stored or generated by pattern device 168 of BERT 160 and an identical pattern is stored or generated in pattern device 269 of BERT 260. The main complication is to arrange for the proper alignment of the data stream transmitted by transmitter 161 with the data stream detected by receiver 262; this is called block synchronization. There are well-known techniques to accomplish such alignment of emitted and detected data streams so that bit errors may then be accumulated. For example, see Chapter 5 of *Digital Transmission Systems and Networks, Volume* 1, by M. J. Miller and S. V. Ahamed, published by Computer Science Press, 1987. (The block synchronization or alignment of data streams needs to be distinguished from the problem of bit synchronizing a transmitter-receiver pair; in the case of bit synchronization, the concern is one of establishing the correct sample instant so that it is possible to discern a logic 1 level from a logic 0 level with maximum likelihood. There is no absolute way to evaluate the integrity of the detected bit; only a relative comparison can provide the required information.) Finally, controller 164 and transmitter 161 pass information through their M ports and controller 164 and receiver 162 pass information through their D ports. Similarly, controller 264 communicates with transmitter 261 and receiver 262 through their M and D ports, respectively.

It is informative at this juncture to reiterate and emphasize some key characteristics to conventional bit error rate testing described with reference to FIGS. 1-5 since this serves as the point of departure from the art for the present invention. First, there is a fundamental difference between a field test environment and a laboratory set-up brought about by the physical separation of end systems in the field. Accordingly, the field test environment is characterized by single-ended testing utilizing a portable BERT, and the BERT test circuitry is less sophisticated than would be required in laboratory testing since the primary purpose of the field test is to discern the origin of and then fix an error condition. The laboratory equipment, however, should offer sufficient flexibility to test for the myriad of conditions one is attempting to simulate in the laboratory set-up, such as exercising a new modem design or new features incorporated in an existing design. Accordingly, the laboratory tool is more versatile in that the user has control over various test parameters and access to detailed measurement information. Even though a flexible and versatile laboratory set-up is necessary, it is desirable to effect this end without unnecessary duplication of equipment and with a minimal number of manual interconnections so as to increase testing reliability.

Also, because of the physical separation in the field environment, true full-duplex testing requires two complete and independent BERTs—one in each end system terminating the facility involved in the test—and each must have known pattern generating capability. Moreover, even in a laboratory set-up, two independent BERTs with pattern generating capability are required for full-duplex testing, but it is desirable to avoid replication of test sub-systems and an excessive number of plug-in type connections requiring user manipulation.

DISCUSSION OF THE PRESENT INVENTION

1. Overview

Figure 6:
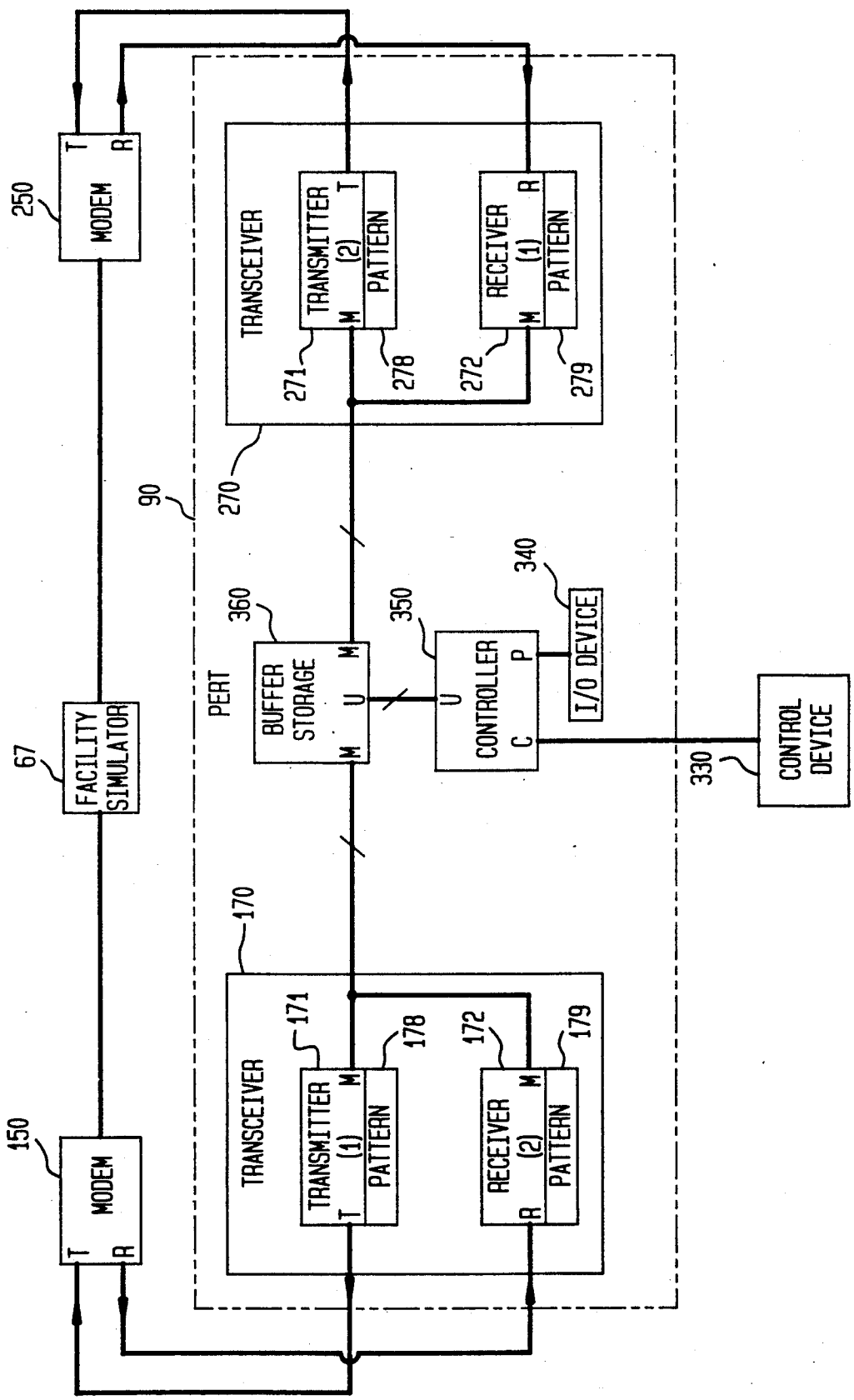
FIG. 6 is an arrangement in accordance with the present invention for the full-duplex testing of a pair of modems in co-located first and second systems, respectively.

The block diagram of FIG. 6 is an arrangement in accordance with one illustrative embodiment of the present invention for the full-duplex testing of co-located modems 150 and 250 wherein the previously discussed first and second BERT test systems merge into single test system 90 now designated the Paired Error Rate Tester (PERT). As before, modems 150 and 250 are interconnected via bidirectional facility simulator 67. PERT 90 generally comprises: transceiver 170 coupled to the T and R ports of modem 150; transceiver 270 coupled to the T and R ports of modem 250; buffer storage 360 coupled to both transceivers 170 and 270 via their M ports; and common controller 350 coupled to buffer storage 360 via their U ports. Also shown in FIG. 6 are two peripheral devices, namely, external control device 330 coupled to controller 350 via the C port, and internal I/O device 340 coupled to controller 350 via the P port. Moreover, because common controller 350 is responsive to control device 330, both transceivers can be controlled from device 330 via an internal memory bus (M); this is in contrast to some of the more elaborate prior art arrangements which provided control commands via an external bus such as parallel interface bus 331 of FIG. 5. The configuration in accordance with the present invention thereby minimizes circuitry and equipment needed for testing by eliminating the need to configure device 330, which is normally a PC or workstation, with two interface bus ports such as, for example, the GPIB (general purpose interface bus—IEEE standard 488) with associated adapter cards, or the need to supply a connector device serving as a GPIB "backplane" interconnecting device 330 and the transceivers.

PERT 90 also advantageously reduces the complexity of the prior art arrangements in that only one controller is required for the complete operation of two independent, full-duplex tests. As such controller 350 is configured with circuitry to control operations which are common to both transceivers 170 and 270, whereas only circuitry and processing unique to the two separate autonomous testing systems is implemented in transceivers 170 and 270. The separate testing systems are formed from sub-components of the transceivers. One autonomous test system is composed of transmitter 171 and receiver 272, whereas the other includes transmitter 271 operating in conjunction with receiver 172.

The actual operation of transceivers 170 and 270 to effectuate the BER measurements is substantially the same as described above with reference to FIG. 5. However, since BERTs 160 and 260 of FIG. 5 each had an associated I/O device, namely, devices 140 and 240, respectively, the BERs in each propagation direction could be displayed concurrently. With the set-up of the present invention, a single I/O device 340 is utilized for display purposes, thereby minimizing equipment duplication, so controller 350 controls access to and the separate display of the individual BERs in response to a request by the system test personnel.

With the requirement that each testing system run autonomously, buffer device 360 effects message, flag, and data passing between the controller and transceivers so that the test systems may run independently of each other.

2. Description

Figure 7:
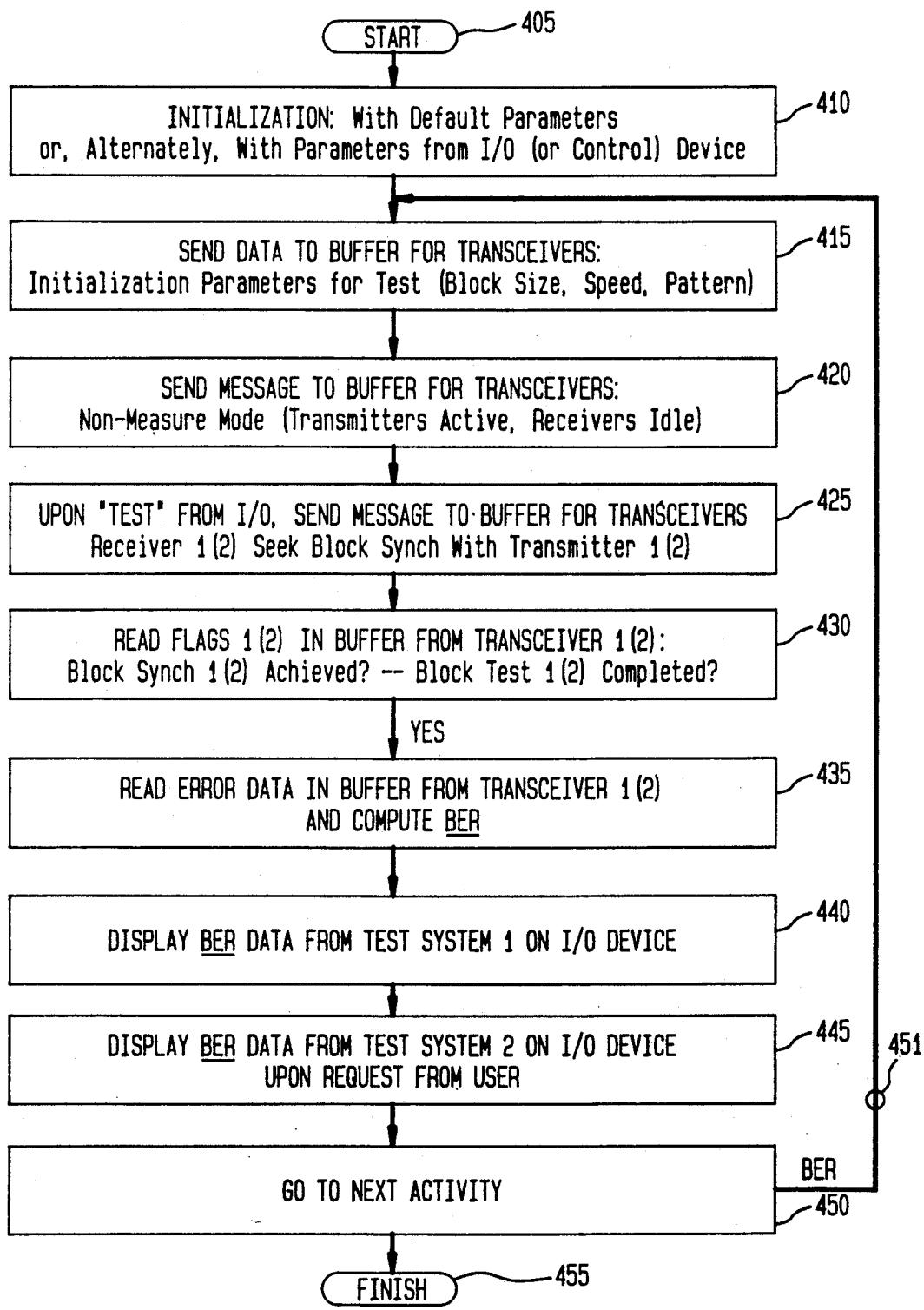
FIG. 7 is a flow diagram depicting processing by the common controller to effect independent bit error rate tests in accordance with the present invention.

The high-level flow diagram of FIG. 7 depicts the processing assigned to controller 350 of PERT 90. Once controller 350 is energized, as represented by processing block 405, an initialization routine is executed, as depicted by processing block 410. Initialization prepares controller 350 to carry out its assigned tasks with baseline information derived either from default parameters available during boot-up of the controller's central processing unit (not shown), or alternately, with parameters provided from I/O device 340 and/or control device 330. Based on information generated during initialization, controller 350 next executes processing block 415, which transmits data to buffer 360 so that both transceivers 170 and 270 may extract this information and thereby have the necessary information to complete their initialization processes. Exemplary data includes: the pattern to be used for testing, e.g., one of the standard $2^n - 1$ maximal length sequences; the size of the block to be measured, usually a multiple of the pattern length; and the speed or baud rate for the test signal. As indicated by the next processing block 420, even though initialization information has been transmitted to the transceivers by execution of block 415, a message is posted to buffer 360 for the transceivers to enter a non-measure mode. In this mode, the transmitters for each test system may be active, but the receivers of each test system are idle. This mode is reserved so that other activities associated with the test may be completed, such as adjusting facility simulator 67.

Upon an indication that a BER test is to be effected, typically by a signal emitted from I/O device 340 in response to the system test personnel activating a "test" indicator on the front panel of device 340, the processing of block 425 is executed. As depicted, controller 350 posts a message to buffer 360 requesting that receivers 272 and 172 each seek block synchronization with the companion transmitters, namely, transmitters 171 and 271, respectively. As indicated in the detailed discussion pertaining to the prior art arrangements, there are well-known techniques for achieving block synchronization or alignment. Briefly, by way of summary and for the sake of completeness, block synchronization may be determined as follows. Since a transmitter-receiver pair, say transmitter 171 and receiver 272, know the test pattern (as provided by pattern generators 178 and 279, respectively) either because the pattern is generated dynamically or it is stored in the pattern generator, the receiver matches its first bit from the test pattern with the incoming bit stream and seeks a match. Upon a single match, the receiver then attempts to match its next bit with the bit in the incoming stream adjacent the first matched bit. This continues until there are, say, five consecutive matches. For long test patterns, it may be possible that five consecutive matches might occur without actually achieving true synchronization. A last phase of synchronization is to look for, say, 80 out of 100 matches in 100 consecutive bits starting with the five matched bits.

After the transceivers lock into synchronization, each transmitter-receiver test pair enters its measurement phase. To inform controller 350 of the synchronization status, a flag is posted in buffer 360 by each receiver as it achieves synchronization so as to alert controller 350 that the measurement mode is now active; processing block 430 depicts this flag-posting activity. Moreover, block 430 also indicates that the controller can test another flag posted to buffer 360 by each test pair to determine when the block test is complete. At this phase of the processing, a completed test for each test system means that both receivers 272 and 172 have data concerning the number of bit positions which have been received in error as transmitted by transmitters 171 and 271, respectively. The errors have been accumulated upon the bit-by-bit comparison of the test pattern with the received data stream as detected by each receiving modem. Accordingly, processing block 435 is invoked to read the error data as stored in buffer 360 by each of the receivers. The BER may then be computed from knowledge of the error data and the block length.

Processing block 440 depicts that controller 350 then activates I/O device 340 to display the BER data, usually of the first test system as determined during initialization. The BER data from the second test system is displayed next, as depicted by processing block 445. The second display is optional and is under control of the test personnel. Finally, as depicted by processing block 445, controller 350 awaits an indication via devices 330 or 340 of whether to effect another BER test by returning via loop 451 to the input of process 415, or that testing is complete, whereupon wrap-up processing is completed by processing block 455.

The controller processing described with respect to FIG. 7 has primarily addressed the interactions between controller 350 and transceivers 170 and 270 to accomplish BER testing; it may be contemplated in view of the foregoing discussion that the controller processing may be arranged with other control operations to provide additional testing flexibility, especially for a laboratory test environment. For instance, the controller processing may have an interrupt routine that would direct either or both transceivers to suspend their current processing, to service the interrupt request, to return information to controller 350 by loading the resultant information in buffer 360, and to reinstate the suspended processing activity.

Figure 8:
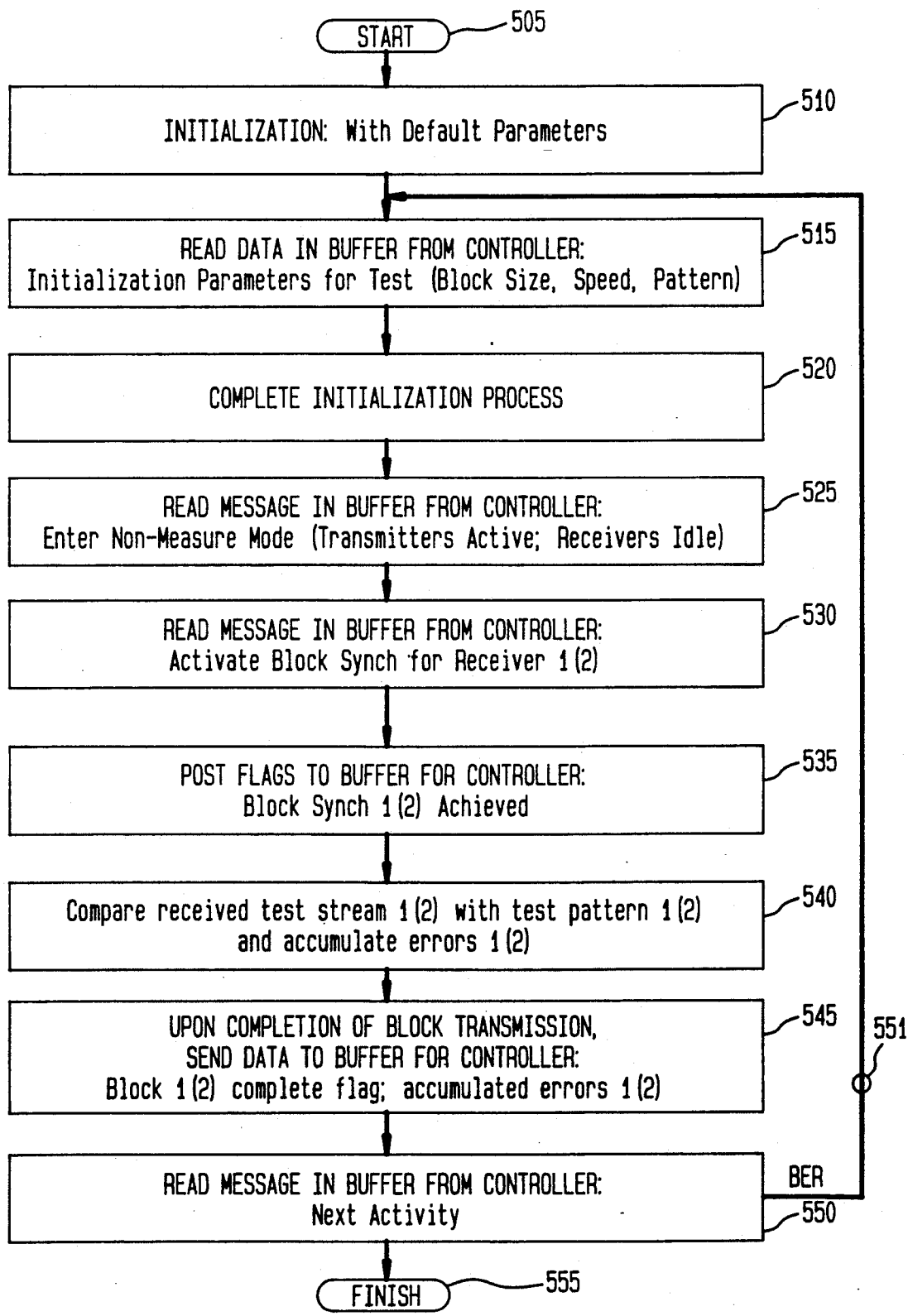
FIG. 8 is a flow diagram depicting processing by a transmitter-receiver pair to effect one of the independent bit error rate tests in accordance with the present invention.

The high-level flow diagram of FIG. 8 depicts the processing assigned to either transceiver 170 or transceiver 270 of PERT 90. The description that follows is couched in terms of transceiver 170; the description for transceiver 270 would be essentially the same. In fact, to convey this parallelism, any reference to elements or operations of the first test system (e.g. receiver 1 of processing block 430, meaning the receiver of the first test system, that is, receiver 272 using the reference numeral notation) is followed by a parenthetical reference to the second test system. Once transceiver 170 is energized, as represented by processing block 505, an initialization routine is executed, as depicted by processing block 510. Initialization prepares transceiver 170 to complete its assigned tasks with standard information obtained from default parameters during boot-up. Next, since transceiver 170 is acting under control of controller 350, processing of block 515 is invoked to read any data loaded into buffer 360 by controller 350. Typical parameters found stored in buffer 360 include the total number of bits to be transmitted, the speed of transmission, and the maximal length test pattern. With this added information, transceiver 170 can complete the initialization process, as represented by processing block 520. Then, via processing block 525, transceiver 170 checks buffer 360 for any messages that have been posted. Typically at this juncture in the processing, controller 350 activates transmitter 171 so that data propagation occurs over the first propagation path, but receiver 272 remains in the idle mode. The next message awaited is the one placing receiver 272 in the active mode wherein block synchronization is effected and measurement of bit errors begins; processing routine 530 depicts this next processing stage. The processing then proceeds to block 535 which is invoked to inform controller 350 that the block synchronization has occurred; this is accomplished by writing a flag to buffer 360 upon synchronization. The measurement phase shown by processing routine 540 commences immediately upon block synchronization, with the errors being determined by a bit-by-bit comparison of the data stream detected by the received modem. The number of bit errors are accumulated, and at the completion of the transmission of the designated block of bits, processing block 545 is executed to send a flag to buffer 360 indicating that block transmission is complete and to store the resultant data in buffer 360 for subsequent retrieval by controller 350. Finally, transceiver 170 awaits a message from controller 350 informing the transceiver of its next activity, as shown by processing routine 550. Upon notification, either another BER commences by returning to the input of processing block 515, or processing is complete, as indicated by termination processing block 555.

To reduce memory requirements and computational time, it is possible to coordinate the operations of controller 350 and transceivers 170 and 270 to process segments of the block transmission test. Thus, rather than await completion of the transmission of the total number of bits in the test block, interim results from sub-blocks may be transmitted upon completion to controller 350 on a first-in, first-out basis. In this way, the controller and transceivers may operate in parallel with appropriate data.

Figure 9:
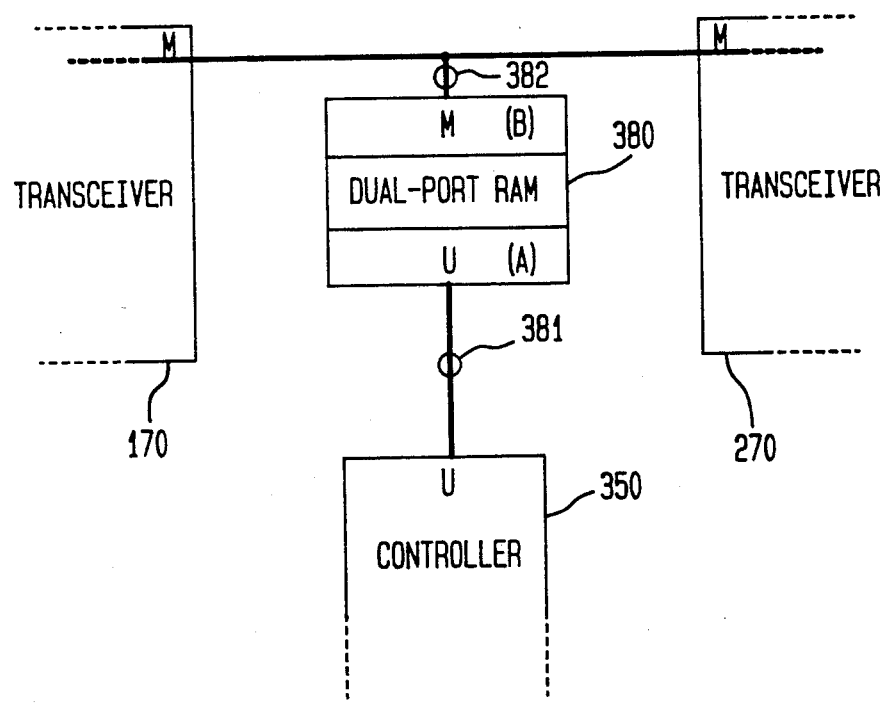
FIG. 9 is a dual-port random access memory (RAM) realization of buffer storage 360 of FIG. 6.

In a component-level illustrative embodiment of the present invention, buffer storage 360 may be realized with dual-port random access memory (RAM) 380 (DPR), as illustrated in FIG. 9. By design, a DPR has two ports (A and B in FIG. 9), each serving as an input/output interface and which are accessible independently but not concurrently. An exemplary commercial device serving as buffer device 360 is the AMD 2130 type Dual-Port RAM currently provided by Advanced Micro Devices, Inc. In the implementation of FIG. 9, one port (A) of DPR 380 connects to controller 350 via control bus 381, whereas the other port (B) is coupled to both transceivers 170 and 270 via memory bus 382. Bus 382 is, illustratively, a multiple-access bus, and transceivers 170 and 270 are then configured with bus contention resolution capability.

It is to be further understood that the methodology described herein is not limited to specific forms by way of illustration, but may assume other embodiments limited only by the scope of the appended claims.

What is claimed is:

1. Circuitry for testing a data system composed of first and second modems terminating a transmission link to determine a first Bit Error Rate (BER) of a first propagation path from the first modem through the link to the second modem, and a second BER of a second propagation path from the second modem through the link to the first modem, and for displaying the first and second BERs on an Input/Output (I/O) device viewable to a user of the circuitry, the circuitry comprising:
a first autonomous test system, coupled to both modems, for determining data system errors in a first transmission direction to generate the first BER;
a second autonomous test system, coupled to both modems, for determining data system errors in a second transmission direction to generate the second BER;
a common controller, coupled to the I/O device, for independently controlling both of said test systems in response to user instructions supplied through the I/O device; and
buffer means, coupled to said controller and to said first and second testing systems, for posting information transferred between said controller and said test systems to separately control each of said test systems, and for independently storing the first and second BERs from said first and second test systems, wherein said buffer means comprises a dual-port RAM and a multiple access memory bus serving said dual-port RAM and both of said autonomous test systems; and
wherein said controller provides separate access to and display of the first BER or the second BER on the I/O device in response to user selection.

2. The circuitry as recited in claim 1 wherein said first test system comprises first transmitter means coupled to one of the modems and first receiver means coupled to the other of the modems, and said second test system comprises second transmitter means coupled to said one of the modems and second receiver means coupled to said other of the modems, said first transmitter means and said second transmitter means propagating a first test bit stream and a second test bit stream, respectively.

3. The circuitry as recited in claim 2 wherein said first transmitter means and said first receiver means each further comprise means for storing a first test pattern corresponding to said first test bit stream utilized in determining the first BER, and wherein said second transmitter means and said second receiver means each further comprise means for storing a second test pattern corresponding to said second test bit stream utilized in determining the second BER.

4. The circuitry as recited in claim 2 wherein said controller further comprises an access network for connecting to an external control device and for passing test information between said circuitry and the control device, said access network including a standardized parallel bus port.

5. Circuitry for testing a data system composed of first and second modems terminating a transmission link to determine a first Bit Error Rate (BER) of a first propagation path from the first modem through the link to the second modem, and a second BER of a second propagation path from the second modem through the link to the first modem, and for displaying the first and second BERs on an Input/Output (I/O) device viewable to a user of the circuitry, the circuitry comprising:
first data transmitter means, coupled to the first modem, for propagating a first test bit stream over the first path;
first data receiver means, coupled to the second modem, for detecting a first received bit stream corresponding to said first test bit stream, and for determining errors between bits of said first received stream and said first test stream to provide the first BER;
second data transmitter means, coupled to the second modem, for propagating a second bit stream over the second path;
second data receiver means, coupled to the first modem, for detecting a second received bit stream corresponding to said second test bit stream, and for determining errors between bits of said second received stream and said second test stream to provide the second BER;
wherein said first transmitter means and said second receiver means form a first autonomous BER test system, and wherein said second transmitter means and said first receiver means form a second autonomous BER test system;
a common controller, coupled to the I/O device, for independently controlling both of said test systems in response to user instructions supplied through the I/O device; and
buffer means, coupled to said controller and to said first and second transmitter means and receiver means, for posting information transferred between said controller and said test systems to separately control each of said test systems, and for independently storing the first and second BERs from said first and second test systems, wherein said buffer means comprises a dual-port RAM and a multiple-access memory bus serving said dual-port RAM, both of said transmitter means, and both of said receiver means; and wherein said controller provides separate access to and display of the first BER or the second BER on the I/O device in response to user selection.

6. The circuitry as recited in claim 5 wherein said first transmitter means and said first receiver means each further comprise means for storing a first test pattern corresponding to said first test bit stream utilized in determining the first BER, and wherein said second transmitter means and said second receiver means each further comprise means for storing a second test pattern corresponding to said second test bit stream utilized in determining the second BER.

7. The circuitry as recited in claim 5 wherein said first transmitter means and said first receiver means each further comprise means for storing a first test pattern corresponding to said first test bit stream utilized in determining the first BER, and wherein said second transmitter means and said second receiver means each further comprise means for storing a second test pattern corresponding to said second test bit stream utilized in determining the second BER.

8. The circuitry as recited in claim 5 wherein said controller further comprises an access network for connecting to an external control device and for passing test information between said circuitry and the control device, said access network including a standardized parallel bus port.

* * * * *